United States Patent
Weber

[11] Patent Number: 5,221,237
[45] Date of Patent: * Jun. 22, 1993

[54] INTERMITTENT MOTION DRIVE ASSEMBLY INCLUDING SPEED REDUCTION

[76] Inventor: Theodore Weber, 45 Tweed Blvd., Nyack, N.Y. 10960

[*] Notice: The portion of the term of this patent subsequent to Jan. 14, 2009 has been disclaimed.

[21] Appl. No.: 936,610

[22] Filed: Aug. 27, 1992

[51] Int. Cl.⁵ .............................................. F16H 3/74
[52] U.S. Cl. ........................................ 475/14; 475/17; 475/331; 475/904; 74/393
[58] Field of Search .................... 475/14, 17, 331, 904; 74/393

[56] References Cited

U.S. PATENT DOCUMENTS

| | | | |
|---|---|---|---|
| 2,767,592 | 10/1956 | Radzimovsky | 475/14 OR |
| 3,507,162 | 4/1970 | Nomura et al. | 475/14 OR |
| 3,516,267 | 6/1970 | Uhlir | 475/14 X |
| 3,529,485 | 9/1970 | Köfferlein | 475/14 OR |
| 3,730,014 | 5/1973 | Brems | 475/14 OR |
| 5,080,636 | 1/1992 | Weber | 475/14 OR |

Primary Examiner—Leslie A. Braun
Assistant Examiner—Daniel Wittels
Attorney, Agent, or Firm—Brooks Haidt Haffner & Delahunty

[57] ABSTRACT

A cylindrical member driven by a planetary gear arrangement traverses an epitrochoid path to periodically enter a radial slot in an arm or disc rotating the arm or disc through 180°. By selecting the parameters appropriately the cylindrical member is caused to enter and leave the radial slot along a tangential path such that no first or second derivative discontinuities are present in the motion of the arm or disc. Several embodiments are disclosed for achieving either one or two incremental rotations of an output shaft for a single revolution of an input shaft with various speed reducing gear trains.

18 Claims, 5 Drawing Sheets

FIG. 11

INTERMITTENT MOTION DRIVE ASSEMBLY INCLUDING SPEED REDUCTION

BACKGROUND OF THE INVENTION

The present invention relates to an intermittent motion drive assembly for converting continuous rotary motion of an input drive member to intermittent rotary output motion of an output member.

Motion converting drive assemblies are well known and have been produced with varying degrees of complexity using cams, gears, levers and the like. For use in driving webs for transporting articles from point to point, for example, there is a need for an intermittent drive assembly that is free from first and second derivative discontinuities whereby smooth acceleration and deceleration is obtained from and to zero velocity movement.

In my U.S. Pat. No. 5,080,636, issued Jan. 14, 1992, there is described and claimed an intermittent motion drive assembly capable of providing the aforementioned desired operation. In the drive assembly described therein, a cylindrical member driven by a planetary gear arrangement traverses an epitrochoid path to periodically enter a radial slot in an arm or disc rotating the arm or disc through 180°. By selecting the parameters appropriately the cylindrical member is caused to enter and leave the radial slot along a tangential path such that no first or second derivative discontinuities are present in the motion of the arm or disc. Several embodiments are disclosed for achieving either one or two incremental rotations of an output shaft for a single revolution of an input shaft.

In attempting to adapt the drive assembly to various uses, a need has arisen to provide for speed reduction with concomitant increase in power delivering capability. Ideally, the improved ability should be obtained without requiring an increase in envelope size of the assembly.

SUMMARY OF THE PRESENT INVENTION

It is, therefore, an object of the present invention to provide an improved or enhanced device for converting continuous constant velocity rotary motion of an input drive member to intermittent rotary output motion of an output member where the output motion is free of first and second derivative discontinuities.

Another object of the present invention is to provide such device in a relatively simple and economic form.

In accordance with one aspect of the present invention there is provided an intermittent motion drive assembly for converting continuous constant velocity rotary motion of an input drive member to intermittent rotary output motion of an output member where said output motion is free of first and second derivative discontinuities for constant velocity of said input drive member, said drive assembly comprising in combination a stationary sun gear having a first pitch diameter and a central axis, at least one planetary gear having a second pitch diameter, the ratio of said first to second pitch diameters being equal to N where N is a whole number greater than three, a radially extending body mounted for rotation about an axis coinciding with said sun gear central axis, said planetary gear being rotatably mounted on said body for rotation about a planetary gear axis located at a radial distance $a$ from said sun gear central axis and coupled to said sun gear in an epicyclic gear train for orbital motion about said sun gear central axis, means coupled thereto for imparting rotation to said radially extending body about its axis, a cylindrical member coupled in driven relation to said planetary gear with the longitudinal axis of said cylindrical member disposed parallel to said sun gear central axis and offset by a radial distance $b$ from the axis of rotation of said planetary gear, said axis of said cylindrical member traversing an epitrochoid path of N lobes centered about said sun gear central axis as said cylindrical member is driven by said planetary gear as the latter is driven about said central axis of said sun gear, said epitrochoid path having alternating convex and concave sections joined by points of inflection, an output member, means operatively coupled to said output member for driving said output member, said means having two body portions each supported for rotation about a center located midway between along a straight line joining two of said points of inflection which two points of inflection mark the boundary of a contiguous sequence of concave section, inflection point, convex section, inflection point, and concave section of said epitrochoid path, each of said body portions having a radial slot open at its radially outward end and disposed at a distance from the center of the rotation of the corresponding body portion such as to be engageable by said cylindrical member for rotating said body portion and thereby said output member during the travel of said cylindrical member between said two inflection points which mark the boundaries of said contiguous sequence of sections, the relationship between said N, a and b parameters being defined by the equations $$\tan \tau = \frac{\tan((N+1)\tau)}{N+1} \quad (1)$$

and $$\frac{b}{a} = \frac{-\sin \tau}{(N+1)\sin((N+1)\tau)}, \quad (2)$$

and a detent means is coupled in driven relation to said input drive member for securing said body portions against rotation during the intervals in which said cylindrical member is out of engagement with a body portion.

BRIEF DESCRIPTION OF THE DRAWINGS

The invention will be understood better after reading the following detailed description of the presently preferred embodiments with reference to the appended drawings in which.

The same reference numerals are used throughout the separate figures of the drawings to designate the same or similar parts.

DETAILED DESCRIPTION OF THE PRESENTLY PREFERRED EMBODIMENTS

Figure 1:
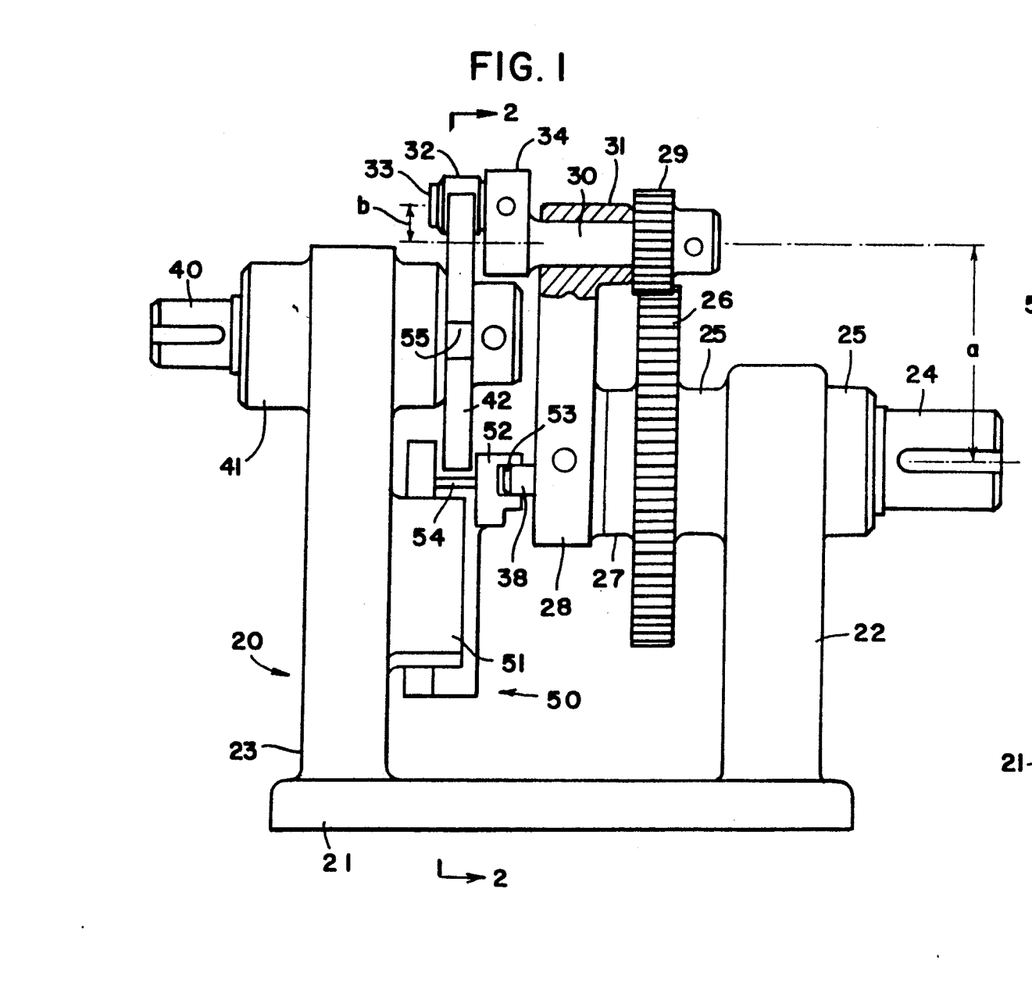
FIG. 1 is a front elevational view of one of the assemblies disclosed in the (−636) patent showing the cylindrical member engaging a body portion within its radial slot at a point midway along the epitrochoid path between the inflection points marking the boundaries of the contiguous sequence of active drive motion.
Figure 2:
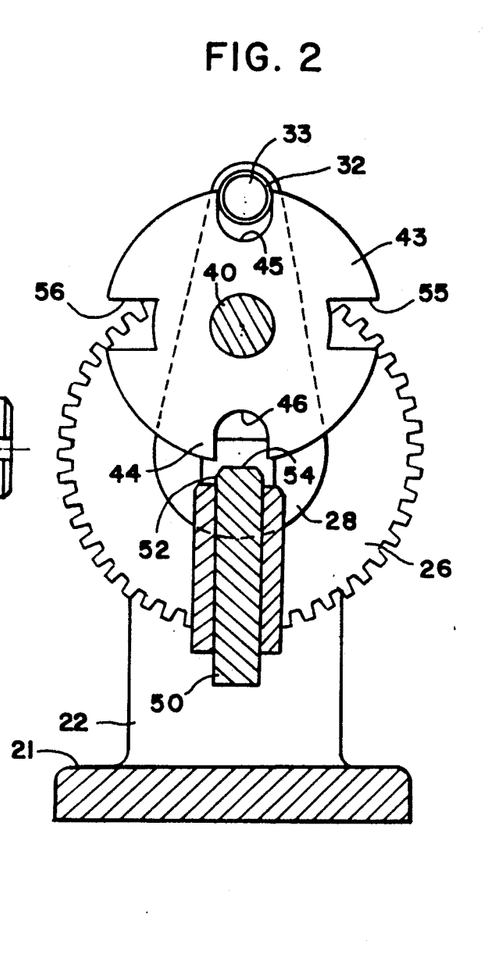
FIG. 2 is a transverse sectional view taken along line 2—2 in FIG. 1.

Referring, now, to FIGS. 1 and 2, there is shown one of the intermittent motion drive assemblies disclosed in my prior patent. A frame, designated generally by the reference numeral 20, and consisting of a base plate 21 supporting two upright standards, 22 and 23, supports the various elements of the drive assembly. An input drive member in the form of an input drive shaft 24 is journaled through a hub 25 near the upper end of standard 22. A stationary sun gear 26 is supported by the hub section 27 concentric with the longitudinal axis of the drive shaft 24. A radially extending arm 28 is joined to the left end, as seen in FIG. 1, of drive shaft 24 for driven rotation with shaft 24. A planetary gear 29 is mounted on a shaft 30 which is journaled for rotation in a hub 31 located on the arm 28 at a radial distance a from the longitudinal axis of the drive shaft 24. The pitch diameters of the sun gear 26 and planetary gear 29 are chosen such that the planetary gear meshes with the sun gear. At the same time the ratio of the respective pitch diameters, designated herein as N, is selected equal to a whole number greater than three. The reasons for such selection will be explained more fully below.

A cylindrical member, here a roller 32, is mounted for rotation concentrically about a shaft 33 which is carried, in turn, near the end of another radial arm 34 which is mounted on the opposite end of shaft 30 from planetary gear 29. The cylindrical member 32 is, therefore, coupled in driven relation to the planetary gear 29 with the longitudinal axis of member 32 disposed parallel to the axis of drive shaft 24 and offset by a radial distance b from the axis of rotation of the planetary gear 29.

The portion of the drive assembly described so far represents the input section of the assembly. In operation, when the drive shaft 24 is rotated, the arm 28 rotates along with shaft 24 transporting planetary gear 29 about the sun gear 26. It should be apparent that the longitudinal axis of the cylindrical member 32 will traverse an epitrochoid path, assuming that dimension b is not equal to the pitch radius of planetary gear 29 in which case the path will be epicycloid. The epitrochoid path will have N lobes centered about the axis of drive shaft 24 where N is as defined above. The epitrochoid path has alternating convex and concave sections joined by points of inflection, all as explained in my patent.

The input section has one further component in the form of a detent drive pin or finger 38, projecting longitudinally from the end of drive shaft 24. The finger 38 is eccentrically located relative to the axis of shaft 24 by an appropriate amount to perform the function that will be described below.

For the output section of the drive assembly there is provided an output member in the form of a shaft 40 journaled for rotation in a hub 41 at the upper end of standard 23. In this embodiment a disc 42 is mounted on the righthand end of shaft 40 for driving the latter. The disc may be thought of as having two body portions, 43 and 44, integrally joined and supported for rotation about a center, here the center of shaft 40. Each body portion, 43 and 44, defines a radial slot, 45 and 46, respectively, open at its radially outward end. The location of the center of shaft 40 and disc 42 is somewhat critical to a proper operation of the assembly and will be further described below. The radial slots 45 and 46 are disposed at a distance from the center of rotation of the corresponding body portion 43 and 44, here the center of shaft 40, such that the respective slots 45 and 46 are engageable by the cylindrical member 32 for rotating the body portion and thereby the output member shaft 40 during the travel of the cylindrical member between the two inflection points. The inflection points mark the boundaries of a contiguous sequence of convex and concave sections.

The values for the parameters a, b and $\tau$, where $\tau$ is the angular rotation of the arm 28 clockwise from the position shown in FIG. 2, are determined by the equations $$\tan \tau = \frac{\tan((N+1)\tau)}{N+1} \tag{1}$$

and $$\frac{b}{a} = \frac{-\sin \tau}{(N+1)\sin((N+1)\tau)}. \tag{2}$$

An epitrochoid path satisfying the above equations will be characterized in that a straight line drawn between inflection points will be tangent to the path at such inflection points. The center of shaft 40 should be located at the midpoint of that line. For proper operation, the slots 45 and 46 are located 180° apart with the radius of disc 42 chosen such that slots 45 and 46 each terminate at the point of tangency with the roller 32 when the roller 32 is at either of the transition points. The depth of each of the slots 45 and 46 is selected such that the roller 32 never reaches the bottom of either slot.

If the foregoing equations (1) and (2) are satisfied, there will be no first or second derivative discontinuities in the motion of shaft 40 at the initial and final points of the traversal of the active sections of the epitrochoid. Equation (1) can be solved for $\tau$ by successive approximations. If, for example, N=4, $\tau$ becomes =0.91174 radians or 52.2387°. The ratio b/a becomes 0.160, and the cartesian coordinates of the transition points relative to the center 24 as the origin are given by the following equations:

$$X = \pm(a \sin \tau + b \sin ((N+1)\tau)) \tag{3}$$

and $$Y = a \cos \tau + B \cos ((N+1)\tau) \tag{4}.$$

For a gear ratio of N=4, X=±0.6325a, and Y=0.58-78a.

As mentioned above, the tangents to the epitrochoid at the transition points are perpendicular (normal) to the axis of symmetry of the active section. Since the motion of roller 32 at the transition points is truly radial relative to disc 42, the disc 42 at that instant has zero angular velocity. If the cylindrical member 32 is at an inflection point commencing to enter a slot in one of the body portions 43 and 44, the member 32 will initiate movement of disc 42 from a standstill or zero velocity smoothly up to a maximum velocity and then down toward zero velocity when member 32 reaches the next inflection point. The changes in both velocity and acceleration occur smoothly free from any discontinuities.

It should be apparent that while the cylindrical member 32 is traversing the inactive sections of the epitrochoid path, the disc 42, and consequently the output shaft 40, is free to move unless restrained by some other means. For this purpose there is provided a detent mechanism consisting of latch 50 in the form of a T-bar riding in ways 51, and having a crosshead portion 52 provided with a cross slot 53 into which projects drive pin 38. The upper end 54 of the T-bar web is arranged to enter one or the other of two notches, 55 and 56, provided in the periphery of disc 42, midway between the slots 45 and 46. The eccentricity of pin 38 relative to the longitudinal axis of shaft 24 is selected to time the movement of latch 50 so that it enters notch 55 or 56 at the very moment that cylindrical member 32 is leaving one of the slots 45 and 46. Conversely, the latch 50 leaves an engaged notch 55 or 56 at the instant that member 32 is entering a slot 45 or 46.

If $\tau$ is expressed in degrees, as stated previously, it is equal to approximately 52.2387° for the illustrated case of N=4. The active portion of the epitrochoid path involves a rotation of the input shaft 24 of 2 $\tau$ or 104.4774°. Converted to the fractional part of an input revolution during which output motion occurs yields a value of 0.2902.

For further and more detailed description of the drive assembly of FIGS. 1 and 2, reference should be had to my aforesaid U.S. Pat. No. 5,080,636.

Figure 3:
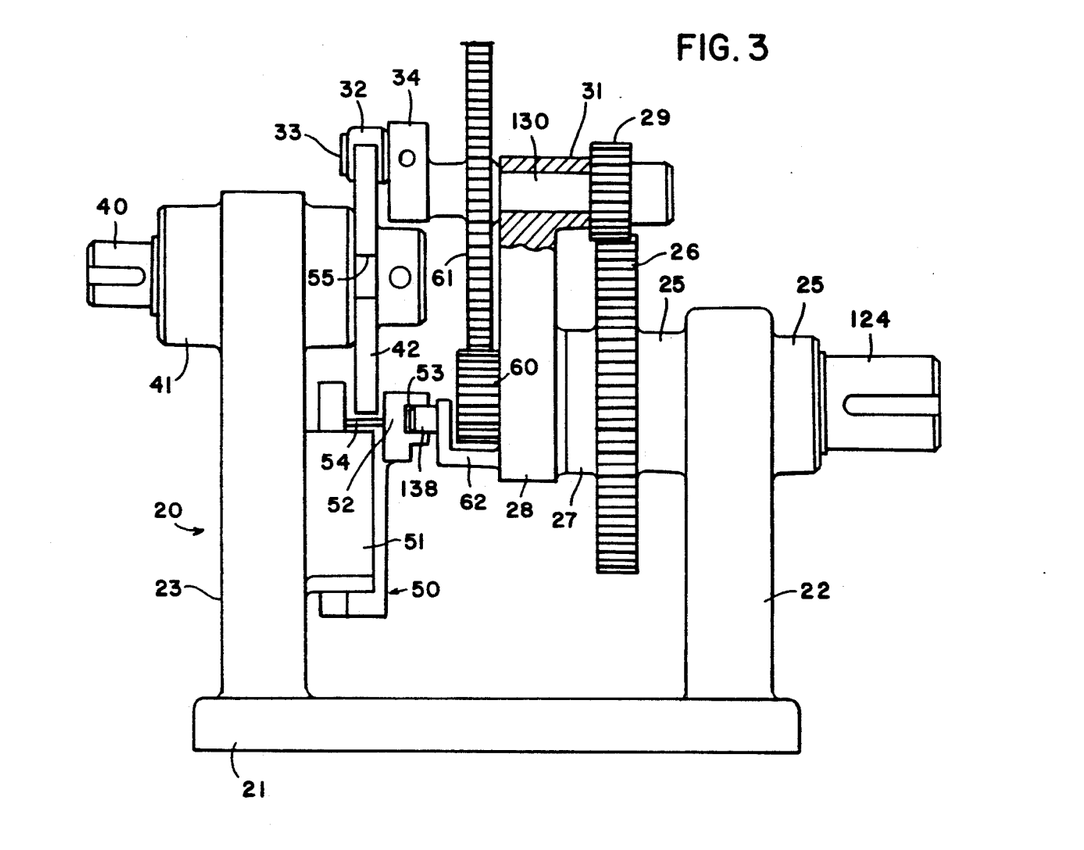
FIG. 3 is front elevational view of a modification of the drive assembly of FIG. 1 incorporating a speed reducing gear train.

Attention should now be directed to FIG. 3. This embodiment differs from the assembly of FIG. 1 in that the drive shaft 124 carries a pinion 60 at its inner end which engages a spur gear 61 mounted on the shaft 130 which carries the spur gear 29 and the arm 34. A pin 138 is secured by a bracket 62 to the arm 28 offset from the center of rotation of arm 28 and is engaged in the cross slot 53 in the crosshead portion 52 of the detent mechanism. The operation of the detent mechanism is the same as that described with reference to FIG. 1.

When the shaft 124 in FIG. 3 is rotated, the pinion 60 drives spur gear 61 imparting rotation to the planetary gear 29 through shaft 130. Since sun gear 26 is stationary, the planetary gear 29 will walk around the sun gear carrying the shaft 130 and arm 28 with it. However, whereas the planetary gear in the FIG. 1 assembly travels around sun gear 26 in the same direction as the direction of rotation of shaft 24, the planetary gear 29 in the FIG. 3 embodiment travels in the reverse direction.

Insofar as the epitrochoid motion is concerned, the number of lobes in a single orbit of the planetary gear is independent of the gear ratio between gears 60 and 61 although such gear ratio affects significantly the speed of the output relative to the input. The illustrated embodiment is characterized by a substantial speed reduction, but with power enhancement.

Figure 4:
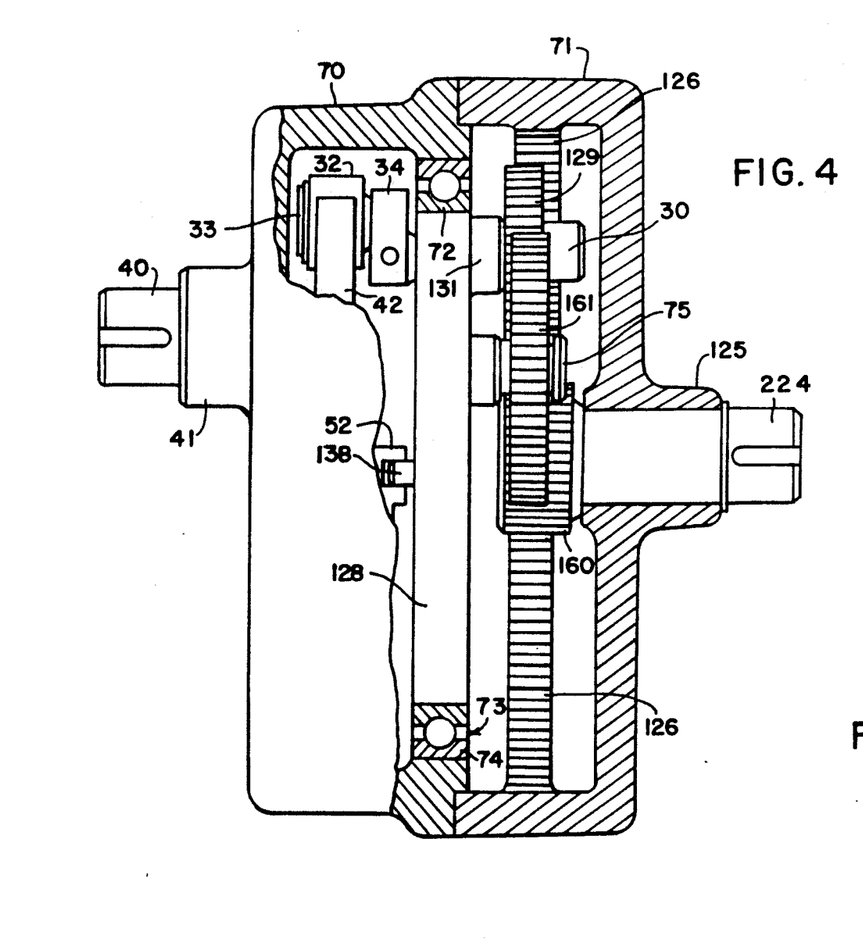
FIG. 4 is front elevational view, partially sectioned, along the line 4—4 in FIG. 5, of another embodiment of the drive assembly employing an internal gear as a sun gear and including a speed reducing gear train including an idler gear.
Figure 5:
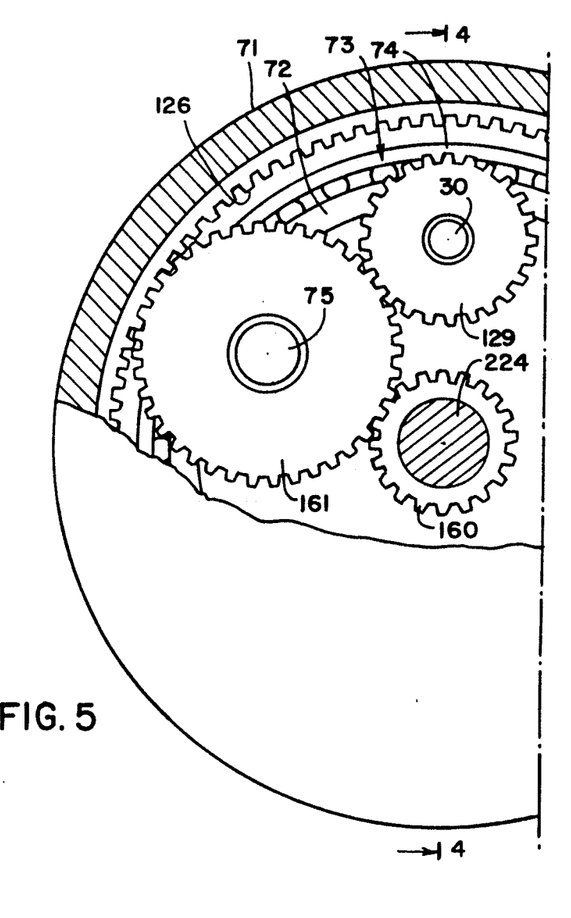
FIG. 5 is an end elevational view of the assembly of FIG. 4 with portions broken away.

In order to maintain the same output direction as the input and produce a more compact assembly, resort can be had to the embodiment shown in FIGS. 4 and 5 to which attention should now be directed. Only those portions are illustrated that differ from the embodiments described previously, the output mechanism being identical. A two-part casing consisting of the parts 70 and 71 encloses all of the gear elements. Casing half 70 is provided with a hub 41 through which is journaled the output shaft 40. The casing half 71 is provided with a hub 125 through which is journaled an input shaft 224 terminating in a pinion 160. The sun gear in this embodiment is an internal gear 126 formed on the interior of casing half 71. The arm 28 is now in the form of a disc 128 whose periphery is mounted in the inner race 72 of a ball bearing assembly 73 whose outer race 74 is secured within the casing half 70, as shown. The disc 128, i.e., radially extending body, rotates about a center coinciding with the centerline or longitudinal axis of the shaft 224. The shaft 30 carrying the planetary gear 129 is journaled through a hub 131 on the disc 128 and connects with arm 34 as in the previously described embodiments.

Completing the assembly is an idler gear 161 journaled on a post or shaft 75 mounted on the disc 128. The shaft 75 is located, and the gear 161 is dimensioned, so as to mesh with all of the gears 129, 160 and 126. Referring to FIG. 5, it will be seen that planetary gear 129 rotates about its axis in the same direction as shaft 224 and pinion 160. The idler gear 161 introduces the direction reversal for this purpose. In addition, pinion 160 and idler gear 161 provide speed reduction. However, the epitrochoid motion remains independent of the gear ratio between gears 160 and 161. During operation, shaft 224 rotates pinion 160 imparting rotation to gear 161 about shaft 75. Because gear 161 is meshed with sun gear 126, the gear 161 "walks" around the inside of the gear 126 and casing half 71. This motion imparts rotation to disc 128 causing the planetary gear 129, to orbit about the axis of shaft 224. At the same time, rotation of idler gear 161 causes rotation of the planetary gear 129 about its center thereby causing shaft 30 to rotate. The output action is then as before.

Comparing the structure in FIG. 4 with that in FIG. 3, in the FIG. 4 embodiment, due to the larger pitch diameter of the sun gear 126 relative to the sun gear 26, for a given ratio N the planetary gear 129 is larger than the planetary gear 29. As a consequence, the tooth loading is less for a given output torque.

Figure 6:
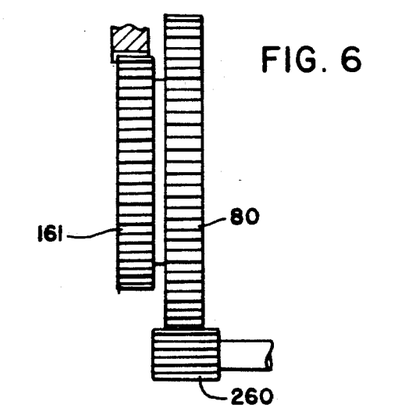
FIG. 6 is a fragmentary view illustrating a modification of the embodiment of FIGS. 4 and 5.
Figure 7:
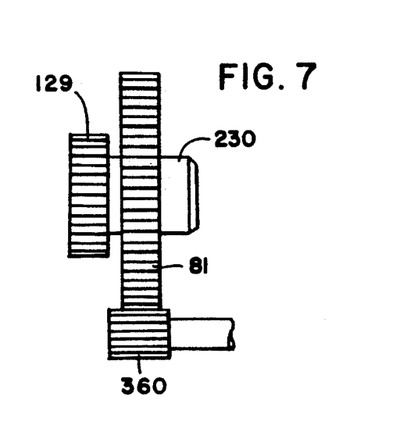
FIG. 7 is a fragmentary view illustrating another modification of the embodiment of FIGS. 4 and 5.

Further modification of the embodiment of FIG. 4 facilitating speed changing is shown in FIGS. 6 and 7. Instead of driving the idler gear 161 with pinion 160 at the end of shaft 224, a pinion 260 or 360, at the end of the drive shaft 224 can mesh with a gear 80 or 81 attached, respectively, to gear 161 or gear 129.

Figure 8:
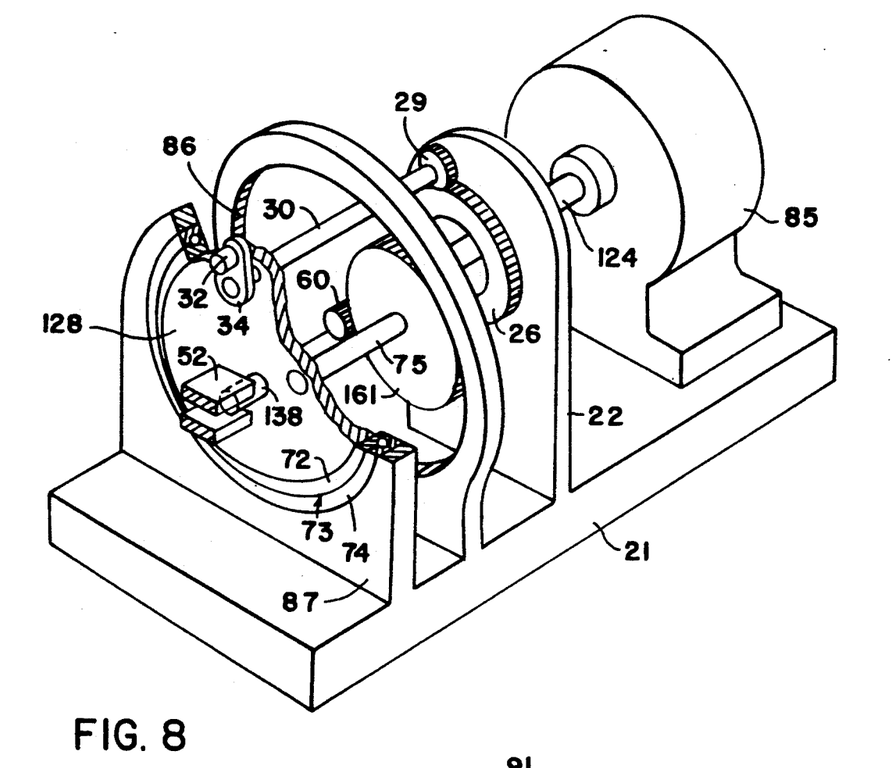
FIG. 8 is a perspective view with portions broken away showing another embodiment of the invention employing an external sun gear and a speed reducing gear train including an idler gear and an internal gear.

A variation of the structures shown in FIGS. 3 and 4 is illustrated in FIG. 8. A motor or other driving device 85 rotates the drive shaft 124 which is provided at its free end with the pinion 60. The pinion 60 meshes with idler gear 161 journaled on shaft 75 carried by disc 128. The gear 161 also meshes with an internal gear 86 supported on the base 21. Rotation of gear 161 causes it to "walk" around the inside of gear 86 thereby orbiting the pinion 60 and driving the disc 128 which is mounted in ball bearing 73 mounted in standard 87 on the base 21. The disc 128, like the same numbered disc in FIG. 4, has journaled therethrough the shaft 30 to which is secured the planetary gear 29 and the arm 34. Planetary gear 29 engages stationary sun gear 26 which is supported by standard 22. The operation should be readily apparent.

In the embodiment of FIG. 8, the internal gear 86 along with gear 60 and 161 provides for speed reduction and driving the radially extending body, or disc 128. In the FIG. 4 embodiment, the functions of gears 26 and 86 are merged into the gear 126.

Figure 9:
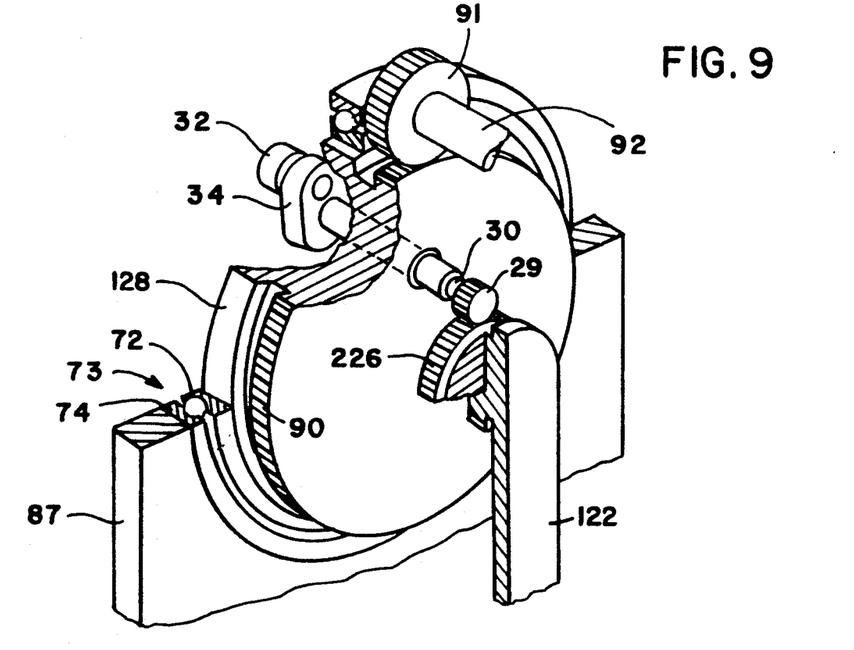
FIG. 9 is a perspective view with parts broken away showing a further embodiment of the invention.

In the embodiments described so far, the input drive shaft is located on the central axis of the assembly so that the shaft axis coincides with the center of revolution of the planetary gear. However, this is not essential. A different input drive arrangement is employed in the next two embodiments illustrated in FIGS. 9 and 10. Turning first to FIG. 9, and spur gear 90 is attached to, actually formed integral with, the disc 128. Gear 90 is driven by a pinion 91 in engagement therewith which is secured to a drive shaft 92. Compared with FIG. 8, the elements 60, 75, 161, 86 and 124 are eliminated and replaced by elements 90, 91 and 92. The sun gear 26 of FIG. 8 no longer has a central aperture for accommodating the drive shaft, but is solid in FIG. 9 mounted on standard 122, also no longer apertured.

Figure 10:
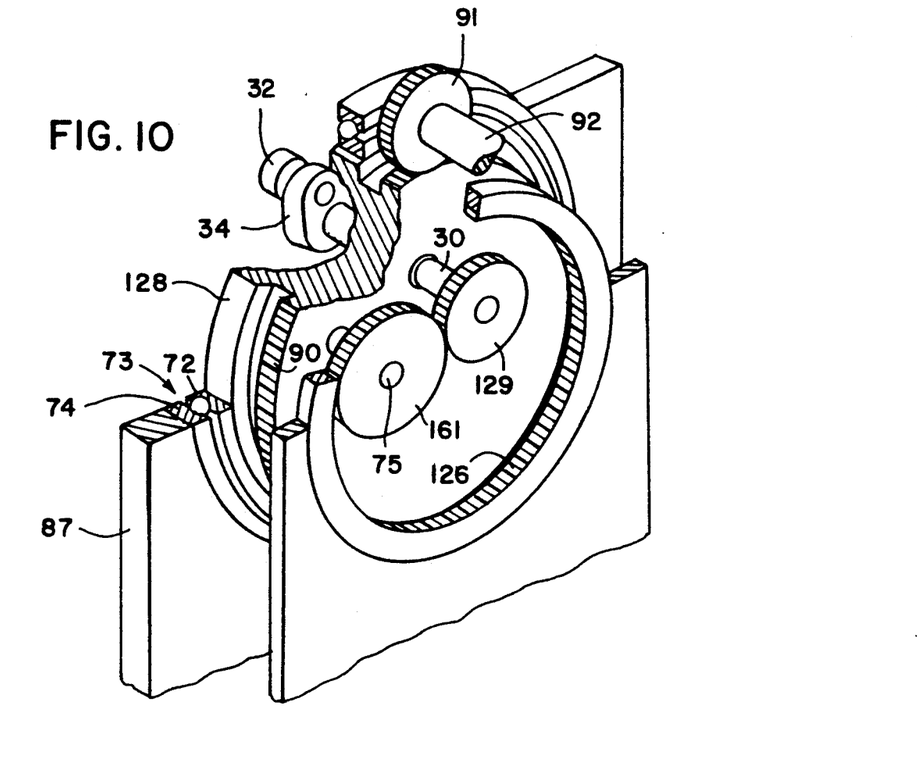
FIG. 10 is a view similar to FIG. 9 showing a modification of the embodiment of FIG. 9.

While the embodiment of FIG. 9 bears considerable similarity to FIG. 8, the embodiment of FIG. 10 resembles the assembly in FIG. 4. The input drive in FIG. 10 is the same as in FIG. 9, shaft 92 driving spur gear 90 through pinion 91. Like FIG. 4, the disc 128 carries shafts 30 and 75, respectively mounting gears 129 and 161. Internal gear 126 serves as the sun gear with gear 161 providing an idler function between the sun gear and the planetary gear 129. The operation of the assembly shown in FIG. 10 should be apparent. Pinion 91 drives disc 128 through spur gear 90. The disc 128 causes both shafts 75 and 30 to orbit causing the idler gear 161 to walk around the inside of gear 126. This causes the idler to rotate about shaft 75 and to drive planetary gear 129 about its shaft 30.

Figure 11:
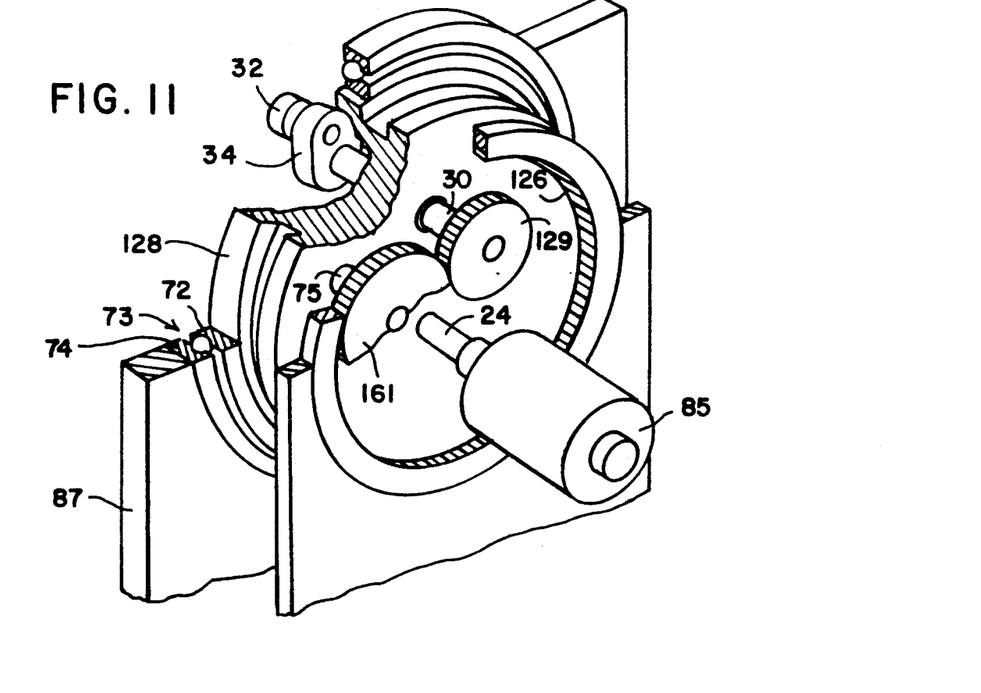
FIG. 11 is a view similar to FIG. 9 showing yet another modification of the invention.

Referring now to FIG. 11, a motor 85 is coupled to drive shaft 24 which is located on the center of the sun gear 126 and is joined to the center of disc 128 for driving the latter. The rest of the construction and operation is the same as the embodiment of FIG. 10.

From a comparison of the various embodiments it should be understood that input torque can be supplied by connecting to any of the rotating parts within the gear train. If desired the connection can be made through intermediate gears. If the drive is to be applied to an orbiting gear, it must be by a gear on the orbiting center.

Having described the present invention with reference to the presently preferred embodiments, it should be understood by those skilled in the subject art that various changes in construction can be introduced without departing from the true spirit of the invention as defined in the appended claims.

What is claimed is:

1. An intermittent motion drive assembly for converting continuous constant velocity rotary motion of an input drive member to intermittent rotary output motion of an output member where said output motion is free of first and second derivative discontinuities for constant velocity of said input drive member, said drive assembly comprising in combination a stationary sun gear having a first pitch diameter and a central axis, at least one planetary gear having a second pitch diameter, the ratio of said first to second pitch diameters being equal to N where N is a whole number greater than three, a radially extending body mounted for rotation about an axis coinciding with said sun gear central axis, said planetary gear being rotatably mounted on said body for rotation about a planetary gear axis located at a radial distance a from said sun gear central axis and coupled to said sun gear in an epicyclic gear train for orbital motion about said sun gear central axis, means coupled thereto for imparting rotation to said radially extending body about its axis, a cylindrical member coupled in driven relation to said planetary gear with the longitudinal axis of said cylindrical member disposed parallel to said sun gear central axis and offset by a radial distance b from the axis of rotation of said planetary gear, said axis of said cylindrical member traversing an epitrochoid path of N lobes centered about said sun gear central axis as said cylindrical member is driven by said planetary gear as the latter is driven about said central axis of said sun gear, said epitrochoid path having alternating convex and concave sections joined by points of inflection, an output member, means operatively coupled to said output member for driving said output member, said means having two body portions each supported for rotation about a center located midway between along a straight line joining two of said points of inflection which two points of inflection mark the boundary of a contiguous sequence of concave section, inflection point, convex section, inflection point, and concave section of said epitrochoid path, each of said body portions having a radial slot open at its radially outward end and disposed at a distance from the center of the rotation of the corresponding body portion such as to be engageable by said cylindrical member for rotating said body portion and thereby said output member during the travel of said cylindrical member between said two inflection points which mark the boundaries of said contiguous sequence of sections, the relationship between said N, a and b parameters being defined by the equations $$\tan \tau = \frac{\tan((N+1)\tau)}{N+1} \tag{1}$$

and $$\frac{b}{a} = \frac{-\sin \tau}{(N+1)\sin((N+1)\tau)}, \tag{2}$$

and a detent means is coupled in driven relation to said input drive member for securing said body portions against rotation during the intervals in which said cylindrical member is out of engagement with a body portion.

2. An intermittent motion drive assembly according to claim 1, wherein said two body portions are joined integrally about a common center of rotation with said respective radial slots located 180° apart.

3. An intermittent motion drive assembly according to claim 1, wherein a second planetary gear with the same pitch diameter as the first planetary gear is rotatably mounted on said body for rotation about a planetary gear axis along with a second cylindrical member in polar symmetry to the corresponding first components and coupled to said sun gear in an epicyclic gear train for orbital motion about said sun gear central axis, said second planetary gear being located diametrically opposite said first planetary gear whereby said first and second cylindrical members engage alternately one or the other of said body portions to alternately rotate one or the other of said body portions through 180°.

4. An intermittent motion drive assembly according to claim 1, wherein said two body portions each comprise an arm having the corresponding radial slot in one end and having its opposite end mounted on a respective output shaft, said output shafts being supported for rotation about separate centers located 180° apart equidistant from said central axis of said sun gear and midway between a corresponding two of said points of inflection which two points of inflection mark the boundary of a contiguous sequence of concave section, inflection point, convex section, inflection point, and concave section of said epitrochoid path, and means coupling said output shafts to said output member such that said body portion arms are constrained for simultaneous rotation in identical phase, whereby said cylindrical member engages alternately one or the other of said body portions to alternately rotate one or the other of said body portions through 180°.

5. An intermittent motion drive assembly according to claim 1, wherein said means for imparting rotation to said body about its axis comprises a drive shaft rotatably mounted with a longitudinal axis coinciding with said central axis of said sun gear, a second shaft journaled in said body upon which is mounted said planetary gear, a driving gear mounted on said second shaft, and a pinion drivingly mounted on said drive shaft and in driving engagement with said driving gear, whereby rotation of said drive shaft is communicated to said planetary gear through a speed reduction and direction reversing gear train.

6. An intermittent motion drive assembly according to claim 1, wherein said sun gear is an internal gear, and said means for imparting rotation to said body about its axis comprises a drive shaft rotatably mounted with a longitudinal axis coinciding with said central axis of said sun gear, a second shaft journaled in said body upon which is mounted said planetary gear, a pinion drivingly mounted on said drive shaft, and a direction reversing idler gear journaled on a post carried by said radially extending body said idler gear being part of a gear train between said pinion and said planetary gear.

7. An intermittent motion drive assembly according to claim 6, wherein said idler gear is in toothed engagement with all of said other gears.

8. An intermittent motion drive assembly according to claim 6, wherein a further gear is joined on a common axis to said idler gear and interposed in the gear train between said pinion and said idler gear.

9. An intermittent motion drive assembly according to claim 6, wherein a further gear is joined on a common axis to said planetary gear and interposed in a gear train between said pinion and said planetary gear, and said idler gear is interposed in toothed engagement with both said sun gear and said planetary gear.

10. An intermittent motion drive assembly according to claim 1, wherein said means for imparting rotation to said body about its axis comprises a drive shaft, and means coupling said drive shaft in driving relation to said radially extending body.

11. An intermittent motion drive assembly according to claim 10, wherein said radially extending body has a continuous external toothed circular perimeter, and said drive shaft has a pinion gear mounted thereon in driving engagement with said toothed perimeter.

12. An intermittent motion drive assembly according to claim 11, wherein said sun gear is an internal gear, and an idler gear is mounted for rotation on a shaft joined to said radially extending body, said idler gear engaging both said internal gear and said planetary gear.

13. An intermittent motion drive assembly according to claim 1, wherein said means for imparting rotation to said body about its axis comprises a drive shaft rotatably mounted with a longitudinal axis coinciding with said central axis of said sun gear and coupled in driving relation to said radially extending body, said sun gear is an internal gear, and an idler gear is mounted for rotation on a shaft joined to said radially extending body, said idler gear engaging both said internal gear and said planetary gear.

14. An intermittent motion drive assembly according to claim 13, wherein said drive shaft is directly connected to said radially extending body.

15. An intermittent motion drive assembly according to claim 14, wherein said radially extending body is in the form of a disc mounted within the inner race of an anti-friction bearing.

16. An intermittent motion drive assembly according to claim 1, wherein said radially extending body is in the form of a disc mounted within the inner race of an anti-friction bearing.

17. An intermittent motion drive assembly for converting continuous constant velocity rotary motion of an input drive member to intermittent rotary output motion of an output member where said output motion is free of first and second derivative discontinuities for constant velocity of said input drive member, said drive assembly comprising in combination an input drive shaft having a longitudinal axis, a stationary sun gear having a first pitch diameter and mounted concentric with said drive shaft axis, at least one planetary gear having a second pitch diameter, the ratio of said first to second pitch diameters being equal to N where N is a whole number greater than three, a radially extending body coupled to said input drive shaft and mounted for driven rotation about an axis coinciding with said drive shaft axis, said planetary gear being rotatably mounted on said body about a planetary gear axis located at a radial distance a from said drive shaft axis and coupled to said sun gear in an epicyclic gear train for orbital motion about said drive shaft axis, a cylindrical member coupled in driven relation to said planetary gear with the longitudinal axis of said cylindrical member disposed parallel to said drive shaft axis and offset by a radial distance b from the axis of rotation of said planetary gear, said axis of said cylindrical member traversing an epitrochoid path of N lobes centered about said drive shaft axis as said cylindrical member is driven by said planetary gear as the latter is driven about said sun gear, said epitrochoid path having alternating convex and concave sections joined by points of inflection, an output member, means operatively coupled to said output member for driving said output member, said means having two body portions each supported for rotation about a center located midway between along a straight line joining two of said points of inflection which two points of inflection mark the boundary of a contiguous sequence of concave section, inflection point, convex section, inflection point, and concave section of said epitrochoid path, each of said body portions having a radial slot open at its radially outward end and disposed at a distance from the center of the rotation of the corresponding body portion such as to be engageable by said cylindrical member for rotating said body portion and thereby said output member during the travel of said cylindrical member between said two inflection points which mark the boundaries of said contiguous sequence of sections, the relationship between said N, a an b parameters being defined by the equations $$\tan \tau = \frac{\tan((N + 1)\tau)}{N + 1} \quad (1)$$

and $$\frac{b}{a} = \frac{-\sin \tau}{(N + 1)\sin((N + 1)\tau)}, \quad (2)$$

and a detent means is coupled in driven relation to said input drive member for securing said body portions against rotation during the intervals in which said cylindrical member is out of engagement with a body portion.

18. An intermittent motion drive assembly according to claim 17, wherein said two body portions are joined integrally about a common center of rotation with said respective radial slots located 180° apart.

* * * * *